United States Patent [19]

Fenton

[11] Patent Number: 4,869,705

[45] Date of Patent: Sep. 26, 1989

[54] CONTINUOUSLY VARIABLE TRANSMISSION

[76] Inventor: John W. Fenton, 26 Shoreland Dr., Key Largo, Fla. 33037

[21] Appl. No.: 214,423

[22] Filed: Jul. 1, 1988

[51] Int. Cl.[4] ............................................. F16H 11/02
[52] U.S. Cl. .......................................... 474/8; 474/21
[58] Field of Search ................... 474/8, 20, 25, 27, 37, 474/39, 41, 43, 86, 87, 268, 201, 242

[56] References Cited

U.S. PATENT DOCUMENTS

| | | | |
|---|---|---|---|
| 2,672,761 | 3/1954 | Nelson | 474/20 |
| 3,434,641 | 3/1969 | Ambros | 474/41 X |
| 4,643,703 | 2/1987 | Yasuda et al. | 474/201 X |
| 4,689,038 | 8/1987 | Henderson | 474/201 X |

FOREIGN PATENT DOCUMENTS 0706485 6/1931 France .................................. 474/20

OTHER PUBLICATIONS

"Finally CVT", Popular Science, pp. 56–59, Sep. 1987.

Primary Examiner—Thuy M. Bui
Attorney, Agent, or Firm—Dunlap, Codding, Peterson & Lee

[57] ABSTRACT

A continuously variable transmission having pulleys mounted on parallel input and output shafts and an endless belt engaging both pulleys for power transmission from the input shaft to the output shaft. The pulley on the output shaft is split into axially spaced halves having facing conical surfaces for variation of the radius at which the belt engages such pulley. One or both halves of the pulley on the output shaft have threaded bores mating with threaded portions of the output shaft.

8 Claims, 7 Drawing Sheets

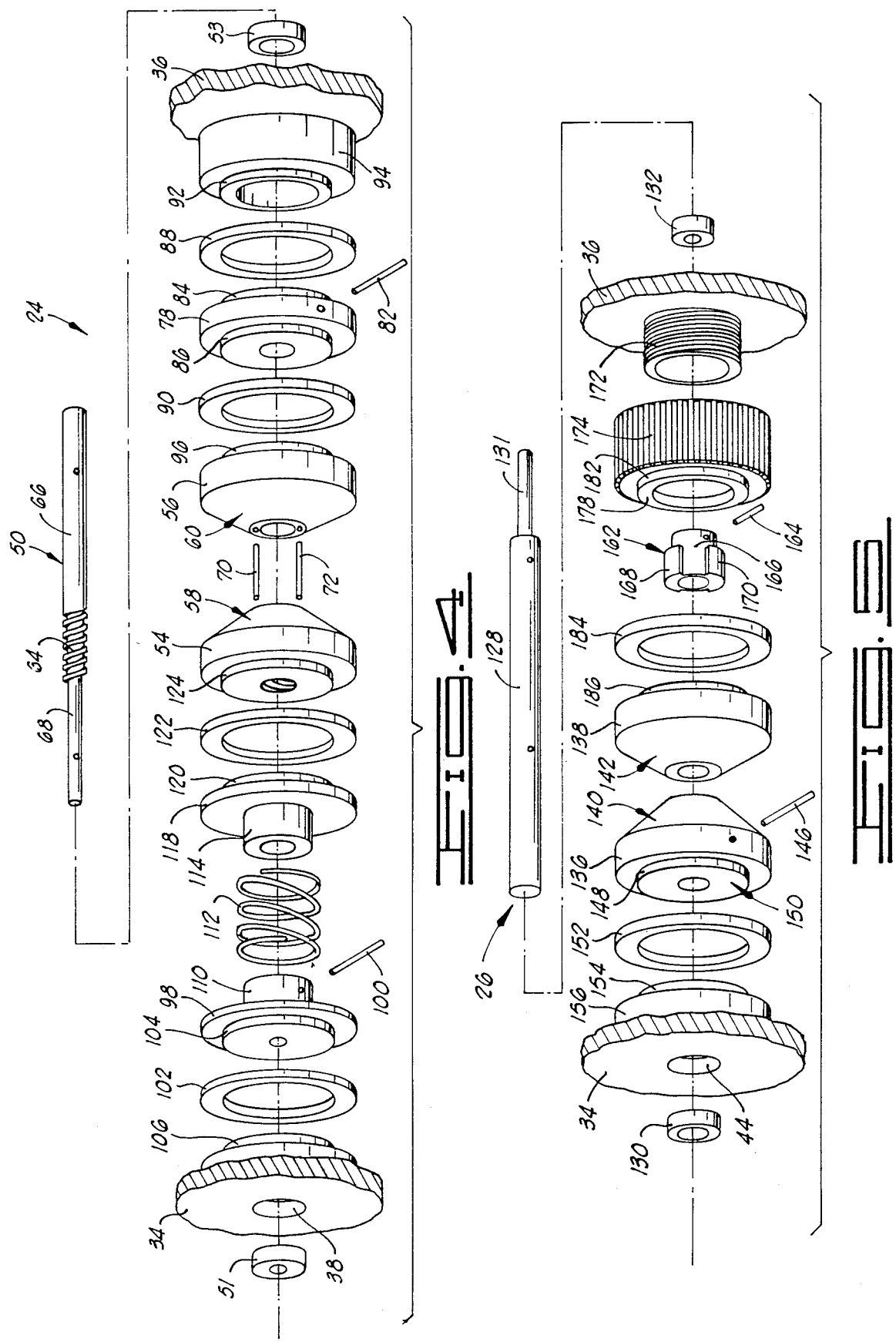

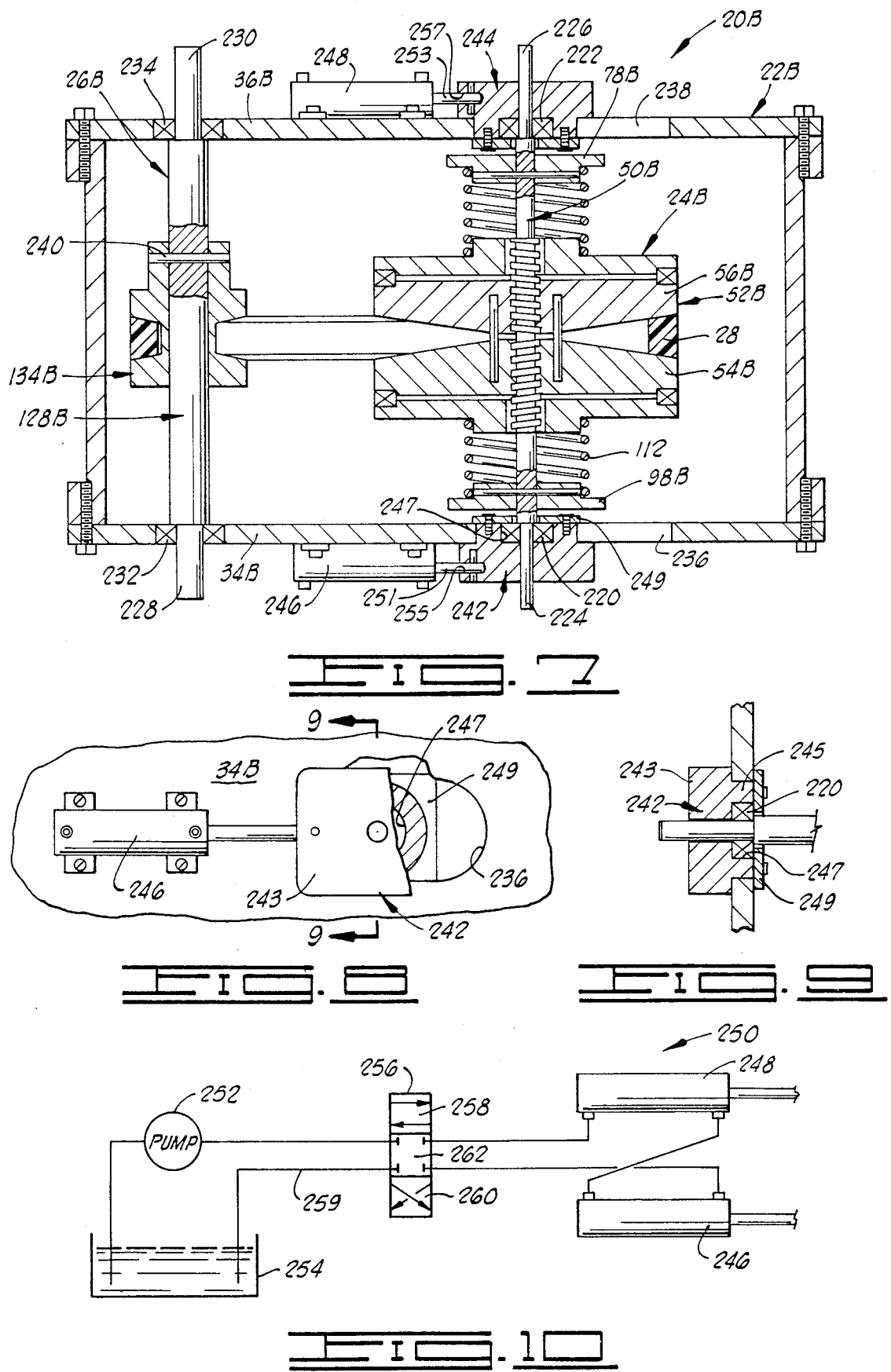

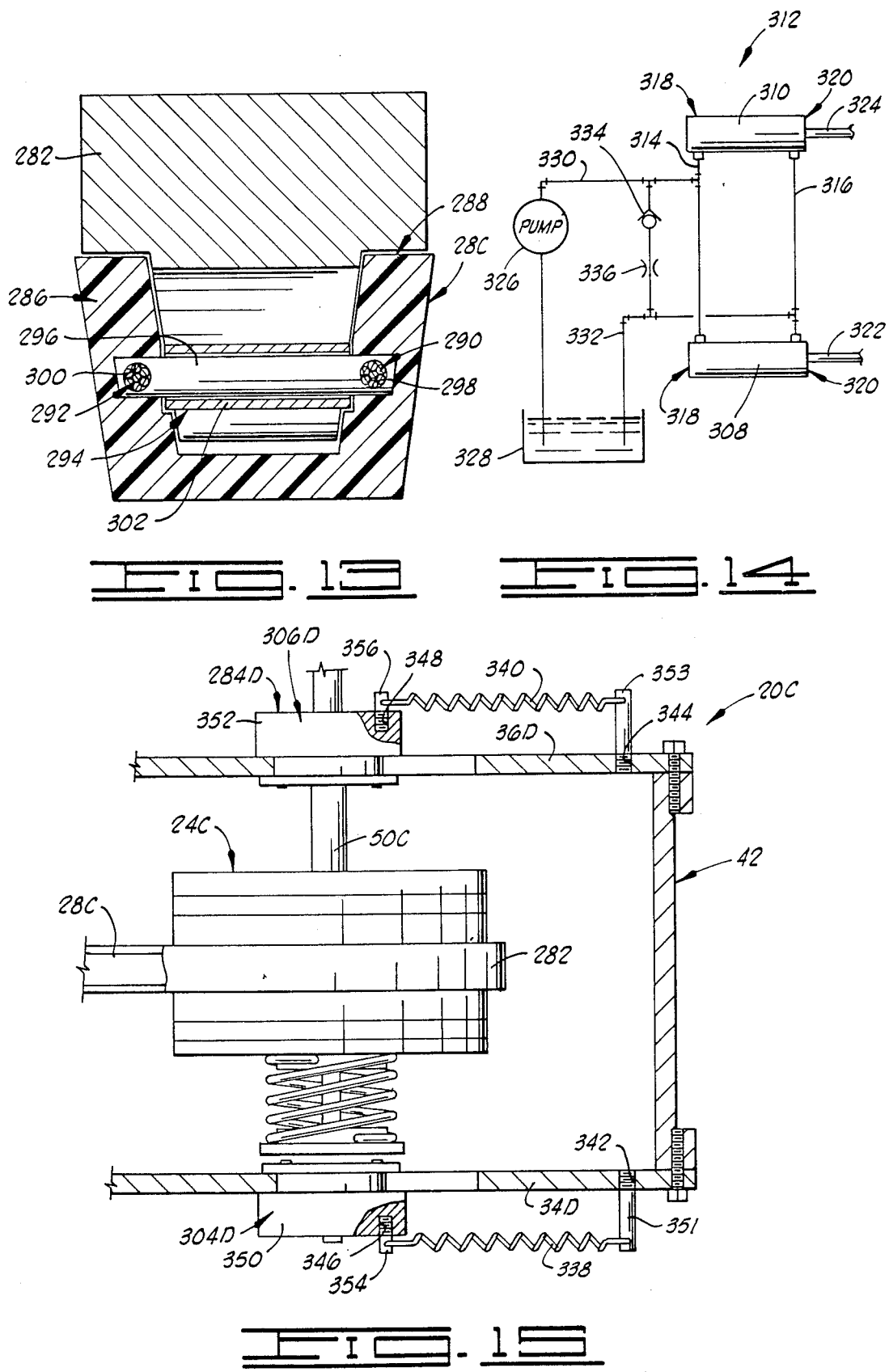

CONTINUOUSLY VARIABLE TRANSMISSION

BACKGROUND OF THE INVENTION

The present invention relates generally to improvements in continuously variable transmissions and, more particularly but not by way of limitation, to continuously variable transmissions of the type having two pulleys, at least one of which is split into two axially positionable halves, mounted on parallel shafts and engaged by an endless belt.

It is well known that the efficiency of an internal combustion engine depends upon the speed at which the engine operates and this knowledge, coupled with the recognition that the earth's energy resources are finite, has led to a great deal of work directed toward the development of practical continuously variable transmissions that would enable various machines; for example, automobiles, to be operated at varying speeds using engines operating at their most efficient speeds. Should such transmissions come into widespread use, the resulting energy savings would have the effect of greatly extending the earth's reserves of fossil fuels such as petroleum and coal.

A type of continuously variable transmission that has attracted a great deal of attention from inventors and engineers employs axially split pulleys mounted on parallel input and output shafts and engaged by an endless belt to effect a variation in the relative rotation rates of the shafts. In this type of transmission, axial positioning of the halves of the pulleys adjusts the ratio of the radii at which the belt is engaged by the pulleys so that the rotation rate of the output shaft can be varied, by the adjustment of the pulleys, while maintaining a constant rotation rate at the input shaft.

While this type of continuously variable transmission has been used effectively in a number of specific applications, it has limitations which have prevented it from being placed in widespread use. In particular, power transmission via an endless belt has given rise to several problems which have not been solved prior to the present invention.

A major problem with transmissions of this type is that the belt may slip on the pulleys so that these transmissions are generally limited to low power applications. In part, this problem is associated with the economics of transmission construction. In order to maintain the cost of such transmissions at a level that makes them practical, it has been a common practice to adjust the spacing of the halves of only one pulley and spring load the halves of the other pulley so that the force exerted by a spring or springs determines both the grip of the pulleys on the belt and the setting of the ratio of the radii at which the belt is gripped by the pulleys; i.e., the effective "gear ratio" of the transmission. In practice, the spring forces limit the torque which can be transferred between the pulleys.

A second problem has been fatigue of the belt. During operation of the transmission, the belt is under tension on one side of a line between the centers of the shafts and relaxed on the other side of the line so that the belt is being continually flexed. This flexing causes heating that can, after a time, result in failure of the material of which the belt is constructed. Additional fatigue, and rapid belt wear, also arises from the bending of the belt and twisting of the belt against the pulleys at such times that the belt is engaged by the pulleys. While a partial solution to this problem can be achieved by using sectioned metal belts which deliver torque through compression, the cost of the belt then becomes a problem. Thus, the problem of belt fatigue remains largely unsolved.

SUMMARY OF THE INVENTION

The present invention provides solutions to these problems that can be economically employed either on a selective or combined basis to overcome one or all of these problems and thereby permit transmissions of the generic type to be used in substantially any application. In particular, the present invention provides a continuously variable transmission that has a capability of varying the grip the pulleys exert on the belt in proportion to the load exerted by the output shaft of the transmission, thereby eliminating slippage problems, and, further, can be readily and economically adapted, on a selective basis, to additionally eliminate belt fatigue arising from either of the sources noted above.

The load proportional gripping of the belt in the transmission of the present invention is achieved by the manner of mounting of one of the split pulleys on the shaft that carries such pulley; for example, the mounting of a split pulley on the output shaft. To this end, and for the case in which the pulley is on the output shaft, such shaft is provided with a threaded portion to mate with matching threads in an axial bore of at least one of the pulley halves thereon and the threads are provided with a handedness that will cause the pulley half so constructed to move axially toward the other pulley half when the pulley is turned on the shaft in the direction of rotation of the output shaft. (In the case in which the pulley is on the input shaft, the handedness of the threads is selected to move the pulley halves together when the pulley is turned on the shaft in a direction opposite the direction of rotation of the shaft.) Thus, should the load on the transmission increase to slow the output shaft, the split pulley thereon will turn slightly on the threaded portion of the shaft to move the two pulley halves together and increase the grip of the pulley on the belt. Since the pitch of the threads on the shaft and in the bore of the pulley half can be selected with reference to the application to which the transmission is to be put, slippage can be eliminated in substantially any set of circumstances in which a continuously variable transmission might be used.

In another aspect of the invention, belt fatigue is reduced or eliminated by the manner in which torque is transmitted between the pulleys and by belt construction. In particular, it is contemplated that the transmission can include a ring gear that extends about the pulleys and has internal teeth that engage rollers embedded in the belt and a biasing assembly that urges the shafts apart to ensure engagement of the ring gear teeth with the rollers. Thus, torque transmission is via the ring gear rather than via the belt. In this case, the torque proportionate gripping feature of the transmission eliminates slippage of the belt and the use of the ring gear for torque transmission further enhances the maximum load characteristics of the transmission while also adding to the longevity of the belt to provide a transmission that is well suited to extreme conditions of operation. Moreover, these extreme conditions can be further countered by a construction of the belt in the manner of a drive chain having liners constructed of mineral fiber filled elastomer on the sides thereof to provide belt strength while maximizing the frictional forces between the belt and the pulleys to prevent belt slippage.

It will thus be seen that the transmission of the present invention enables transmissions of the generic type to be used in substantially any application to which a variable transmission might be put. Moreover, the invention provides a selectivity of features that enables the engineer contemplating the use of a variable transmission to optimize his choice for the application at hand with respect to such factors as load on the transmission, the environment in which the transmission is to be used, maintenance and cost.

An important object of the invention is to provide a continuously variable transmission that can be used in a wide range of applications by eliminating problems that have limited the use of variable transmissions in the past.

Another object of the invention is to provide selectivity of characteristics in continuously variable transmissions that will optimize the adaptation of the transmission to the application at hand.

Yet another object of the invention is to eliminate slippage in variable transmissions of the type employing a belt engaged by adjustably split pulleys to transmit torque between input and output shafts of the transmission.

Still a further object of the invention is to eliminate problems associated with material fatigue in variable transmissions of the generic type that has been described.

Other objects, advantages and features of the invention will become clear from the following detailed description of preferred embodiments of the invention when read in conjunction with the drawings and appended claims.

BRIEF DESCRIPTION OF THE DRAWINGS

FIG. 4 is an exploded view on a reduced scale of the first shaft and pulley assembly of the transmission of FIG. 1.

FIG. 5 is an exploded view on a reduced scale of the second shaft and pulley assembly of the transmission of FIG. 1.

FIG. 7 is a cross section similar to FIG. 3 of a third embodiment of a continuously variable transmission constructed in accordance with the present invention.

FIG. 8 is a fragmentary elevational view of the front cover of the transmission of FIG. 7 illustrating the ratio adjustment assembly thereof.

FIG. 9 is a cross section of the bearing block of the ratio adjustment assembly of the transmission of FIG. 7 taken along line 9—9 of FIG. 8.

FIG. 10 is a schematic diagram of the hydraulic circuit of the ratio adjustment assembly of the transmission of FIG. 7.

FIG. 13 is a cross section on an enlarged scale taken along line 13—13 of FIG. 12.

FIG. 14 is a schematic diagram of the hydraulic circuit of the biasing assembly of the transmission of FIG. 9.

FIG. 15 is a fragmentary cross section in plan view illustrating an alternative construction for the biasing assembly of the transmission of FIG. 9.

DESCRIPTION OF FIGS. 1 THROUGH 5

Figure 1:
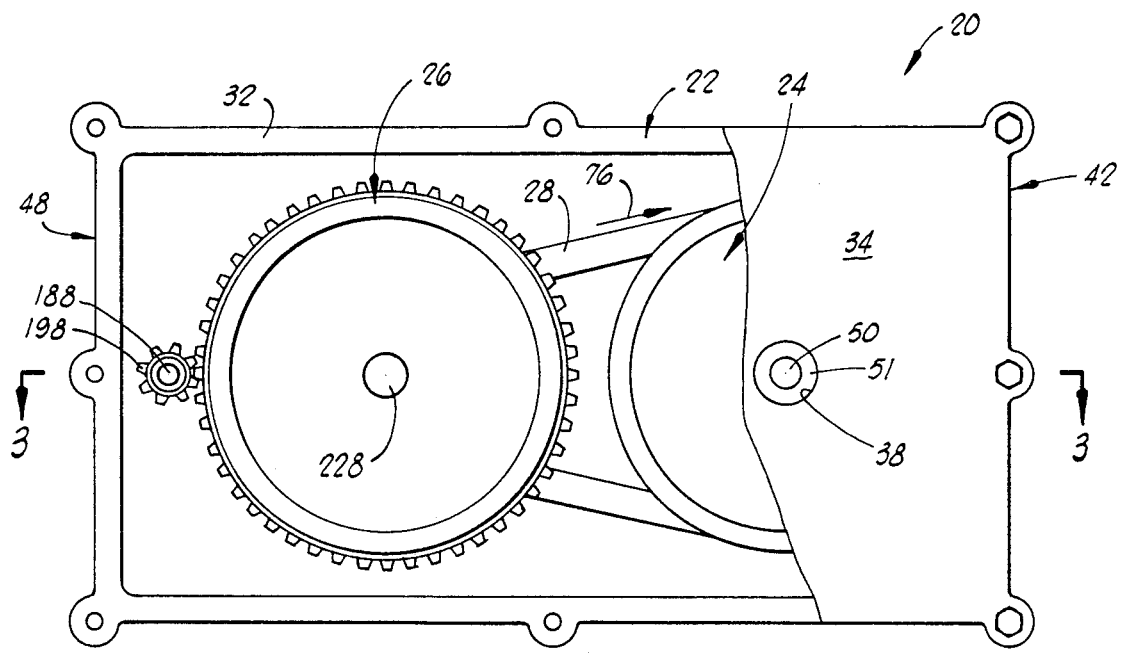
FIG. 1 is an elevational view in partial cutaway of one side of a continuously variable transmission constructed in accordance with the present invention.
Figure 2:
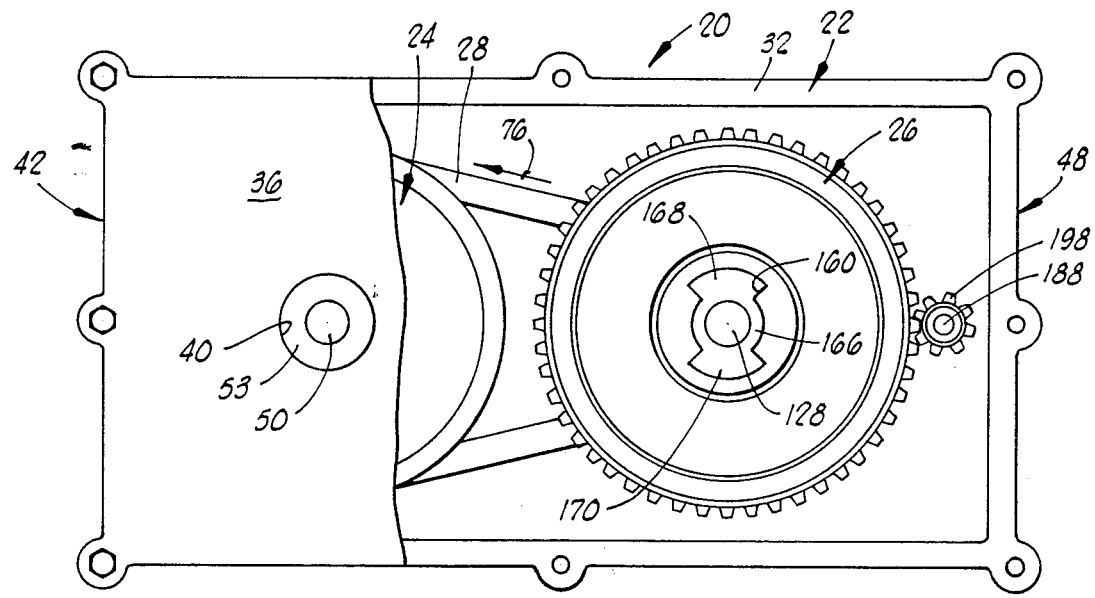
FIG. 2 is an elevational view in partial cutaway of the opposite side of the transmission of FIG. 1.
Figure 3:
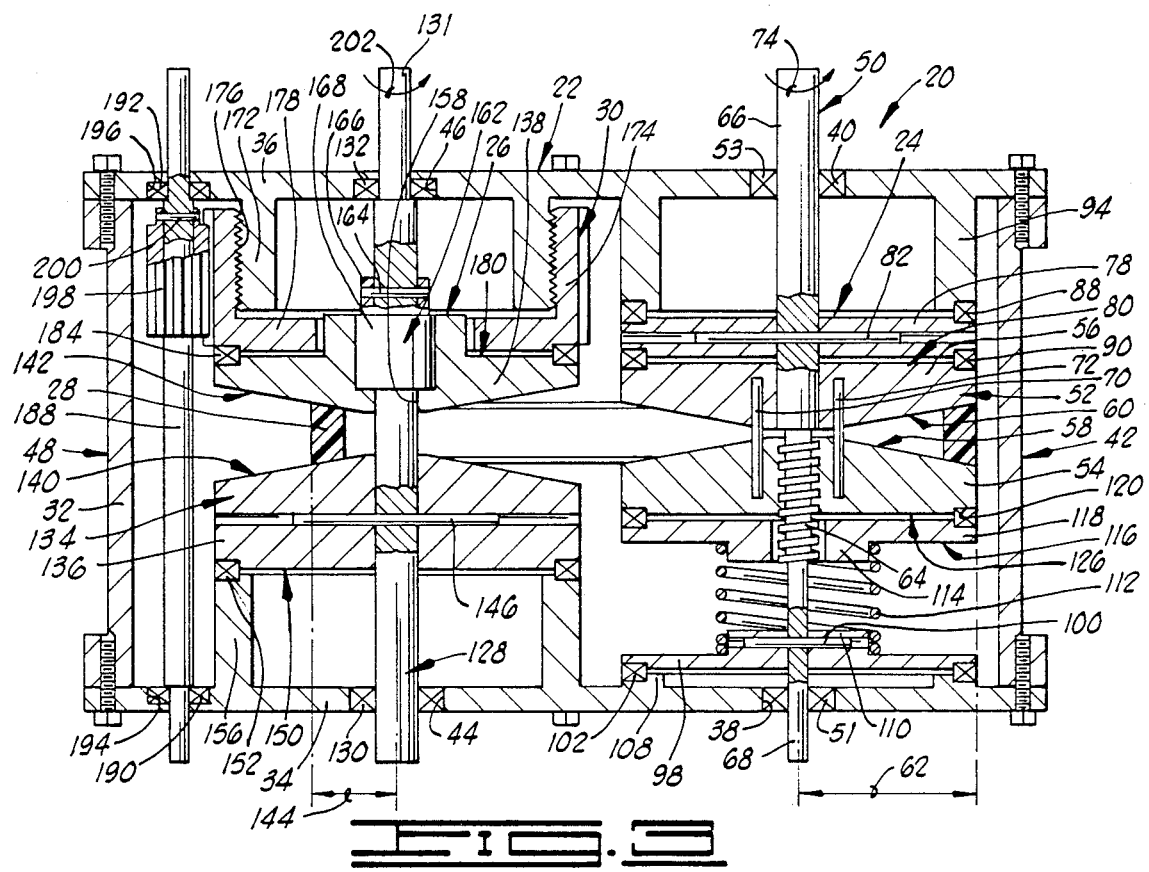
FIG. 3 is a cross section in partial cutaway of the transmission taken along line 3—3 of FIG. 1.

Referring now to the drawings in general and to FIGS. 1 through 3 in particular, shown therein and designated by the general reference numeral 20 is a continuously variable transmission constructed in accordance with the present invention. As shown in these Figures, the transmission 20 is generally comprised of a housing 22 that rotationally supports first and second shaft and pulley assemblies, 24 and 26 respectively, that have been particularly illustrated in FIGS. 4 and 5. Additionally, the transmission 20 includes an endless belt 28 that interconnects the assemblies 24 and 26 in a manner to be discussed below and a ratio adjustment assembly 30 that is utilized to set a "gear ratio" for the transmission 20 in a manner also to be discussed below. In the embodiment shown in FIGS. 1 through 5, it is contemplated that belt 28 is a conventional V-belt made of cloth-reinforced rubber in the manner of an automobile fan belt. Alternative belt constructions have been illustrated for embodiments of the invention to be described below.

The housing 2 is of conventional construction comprising a rectangular, tubular central portion 32 to which front and rear covers, 34 and 36 respectively, are bolted to form a hollow enclosure containing active portions of the transmission 20, Coaxial openings 38 and 40 are formed through the covers 34 and 36 to support the first shaft and pulley assembly 24 near one end 42 of the housing 22 and coaxial openings 44 and 46 (FIG. 3) are similarly formed through the covers 34 and 36 to support the second shift and pulley assembly 26 near the opposite end 48 of the housing.

With particular reference to FIG. 4 and with continuing reference to FIG. 3, the first shaft and pulley assembly 24 is comprised of a transmission first shaft 50 that extends through the interior of the housing 22 to protrude through the openings 38 and 40 in the covers 34 and 36 for rotational support of the shaft 50 via conventional bearings 51 and 53 mounted in the openings 38 and 40 and secured therein in any convenient manner. The first shaft and pulley assembly 24 also comprises a first pulley, generally designated by the numeral 52 in FIG. 3, that is, in turn, comprised of first and second pulley halves 54 and 56 respectively. Each of the pulley halves 54 and 56 has an axial bore through which the first shaft extends for mounting the first pulley thereon and the pulley halves 54 and 56 are provided with facing conical sides 58 and 60, for the halves 54 and 56 respectively, to mate with and grip the sloping sides of the belt 28 as shown in FIG. 3. In particular, a portion of the belt 28 engages the conical sides 58 and 60 along a circular arc at a radius 62 which depends upon the axial separation of the pulley halves 54 and 56. (The radius 62 has been illustrated in FIG. 3 for the maximum value thereof in the operation of the transmission.)

An important aspect of the invention is the manner in which the first pulley 52 is mounted on the first shaft 50 to provide, as will be discussed below, gripping of the belt 28 proportionately to the load driven by transmissions constructed in accordance with the invention. To this end, the first shaft 50 has a threaded central portion 64 between smooth end portions 66 and 68 and the bore of the first pulley half 54 is threaded to mate with the threads on the portion 64 of the shaft 50 so that rotation of the first pulley half 54 on the shaft 50 will result in axial movement of the first pulley half 54 thereon. (The shaft portion 68 can be formed on a reduced diameter to permit mounting of the first pulley half 54 on the shaft 50 as described.) The second pulley half 56 has a smooth bore and is mounted on the smooth portion 66 of the first shaft 50 adjacent the threaded portion 64 thereof. Pins 70, 72 mounted in bores (not numerically designated in the drawings) formed in facing ends of the pulley halves 54 an 56 parallel to the axis of the shaft 50 coordinate the rotational positions of the pulley halves 54 and 56 on the shaft 50.

In accordance with the invention, the handedness of the threads on the shaft 50 and in the bore of the pulley half 54 is determined with regard to whether the first shaft 50 is the input or output shaft of the transmission and the direction in which the first shaft 50 is to rotate during operation of the transmission 20. In particular, if the first shaft 50 is the output shaft of the transmission, the handedness of the threads is selected to move the first pulley half 54 toward the second pulley half 56 when the pulley 52 is rotated on the shaft 50 in the same direction that the shaft 50 rotates if the shaft 50 is the input shaft of the transmission, the handedness of the threads is selected to move the first pulley half 54 toward the second pulley half 56 when the pulley 52 is rotated on the shaft 50 in a direction opposite the direction that the shaft 50 rotates. Thus, for example, if the first shaft 50 is the output shaft of the transmission 20 and rotates in the direction indicated at 74 in FIG. 3 corresponding to a movement of the belt 28 in the direction 76 in FIGS. 1 and 2, the portion 64 of the shaft 50 and the bore of the first pulley half 54 will be threaded in a right-handed sense as shown in FIGS. 3 and 4.

In addition to the first shaft 50 and the first pulley 54, the first shaft and pulley assembly 24 is further comprised of a rear backing plate 78 fixed on the smooth portion 66 of the shaft 50 adjacent a rear side 80 of pulley half 56, opposite the side 60 thereof, via a pin 82 that extends through diametric bores (not numerically designated in the drawings) formed through the backing plate 78 and shaft 50. Circumferentially extending shoulders 84 and 86 are formed on opposite sides of the backing plate 78 to receive, respectively, bearings 88 and 90. The bearing 88 is further received in a circumferentially extending shoulder 92 formed on the distal end of a circular spacing ring 94 formed integrally with the rear cover 36 of the housing 22 to axially support both the first shaft 50 and the rear backing plate 78 against movement toward the rear cover 36 of the housing 22. The bearing 90 is further received in a circumferentially extending shoulder 96 formed in the rear side 80 of the second pulley half 56 to similarly support the second pulley half 56. Support against axial movement of the shaft 50 toward the front cover 34 is similarly provided by: a front backing plate 98 that is fixed to the shaft 50 via a pin 100 mounted in bores (not numerically designated in the drawings) formed diametrically through the shaft 50 and plate 98; and bearing 102 mounted in a circumferentially extending shoulders 104, 106 formed, respectively, on the side of the plate 98 facing the front cover 34 and the distal end of a spacing ring 108 formed integrally with the front cover 34.

The front backing plate 98 has a central boss 110 on which is mounted a compression spring 112 that extends to and is mounted on a boss 114 on one side 116 of a pressure plate 118 mounted on the shaft 50 via a central bore formed therethrough. A circumferentially extending shoulder 120 formed on the opposite side of the pressure plate 118 receives a bearing 122 that is also received in a circumferentially extending shoulder 124 in rear face 126 of the first pulley half 54 so that spring 112 will urge the first pulley half 54 toward the second pulley half 56 and thereby insure contact between the halves 54 and 56 of the first pulley 52 and the belt 28.

Referring now to FIG. 5 and with continuing reference to FIG. 3, the second shaft and pulley assembly 26 is comprised of a second shaft 128 that is rotationally mounted on the housing 22 via bearings 130 and 132 located in the openings 44 and 46 respectively in the front and rear covers 34 and 36 of the housing 22. A second pulley 134, comprised of first and second pulley halves 136 and 138 respectively, is coaxially mounted on the second shaft 128 and the pulley halves 136 and 138 are provided with facing conical surfaces 140 and 142 respectively to engage the sides of the belt 28 along a circular arc that having a radius 144 that depends upon the axial separation of the pulley halves 136 and 138. (The radius 144 has been illustrated in FIG. 3 for the minimum value thereof in the operation of the transmission 20.) In the operation of the transmission 20, the ratio of the radii of the arcs along which the belt 28 is engaged by the pulleys 62 and 134; that is, the "gear ratio" of the transmission 20, is varied in a manner to be discussed below.

The first pulley half 136 of the second pulley 134 has an axial bore (not numerically designated in the drawings) through which the second shaft 128 matingly extends and the pulley half 136 is fixed to the second shaft 128 via a pin 146 that extends through bores (not numerically designated in the drawings) formed diametrically through the second shaft 128 and the pulley half 136. A circumferentially extending shoulder 148 is formed on the rear side 150 of the first pulley half 136 to receive a bearing 152 that is also received in a circumferentially extending shoulder 154 formed in the distal end of a spacing ring 156 that is formed integrally with the front cover 34 of the housing 22. The spacing ring 156 and bearing 152 thus provide axial support against movement toward the front cover 34 of the housing 22 for the second shaft 128 and the first half 136 of the second pulley 134. Axial thrust in the opposite direction can be absorbed by forming an end portion 131 of the second shaft 128 on a reduced diameter and using a radial thrust bearing for the bearing 132.

In order to provide for variation of the spacing of the halves 136 and 138 of the second pulley 134, the second pulley half 138 thereof has an axial bore having a circular portion 158 adjacent the surface 142 that slides on the second shaft 128 and a double keyhole shaped portion 160 (FIG. 2) that receives a key member 162 that is fixed to the second shaft 128 via a pin 164 that extends through bores (not numerically designated in the drawings) extending diametrically through the shaft 128 and a tubular portion 166 of the key member 162. The key member 162 has diametrically opposed, radially extending flanges 168 and 170 that mate with the double keyhole shaped portion 160 of the bore of the second pulley half 138 so that the key member 162 transmits torque between the shaft 128 and second half 138 of the second pulley 134 while permitting axial movement of the half 138 in the shaft 128.

The ratio adjustment assembly 30, a portion of which is illustrated with the second shaft and pulley assembly 26 in FIG. 5, is provided to axially position the second half 138 of the second pulley 134 and thereby adjust the ratio of the radii of the arc along which the belt 28 engages the pulleys 52 and 134 as will be discussed below. To this end, the ratio adjustment assembly 30 is comprised of a tubular, externally threaded projection 172 that can be formed integrally with the rear cover 36 of the housing 22 and extends a distance into the interior of the housing 22 in a coaxial relation about the second shaft 128. A tubular adjustment gear 174, having a bore 176 threaded to mate with the threads on the projection 172 and a circumferentially extending series of teeth on the outer periphery thereof, is screwed onto the projection 172 to extend into the interior of the housing 22 and terminate therein a pressure plate 178 adjacent a rear side 180 of the second pulley half 138 opposite the side of the pulley half 138 whereon the conical surface 142 is formed. Mechanical engagement between the pressure plate 178 and the second pulley half 138 is then effected by a bearing 184 mounted in circumferentially extending shoulders 182 and 186 formed on the pressure plate 178 and the rear side 180 of the second pulley half 138. Thus, the second pulley half 138 can be positioned by turning the adjustment gear 174 on the projection 172 to advance the adjustment gear axially along the second shaft 128.

As particularly shown in FIG. 3, the ratio adjustment assembly 30 is further comprised of a control shaft 188 that is rotationally mounted on the housing 22 to extend therethrough parallel to the second shaft 128 via bearings 190 and 192 that are mounted in openings 194 and 196 respectively in the front and rear covers 34 and 36 respectively of the housing 22. A control gear 198 is mounted on the control shaft 188 via a pin 200 in bores (not numerically designated in the drawings) that extend diametrically through the gear 198 and shaft 188 and the control gear is positioned so that teeth thereof mesh with the teeth on the outer periphery of the adjustment gear 174. Thus, the adjustment gear can be moved in either direction along the second shaft 128 by rotating the control shaft 188.

OPERATION OF FIGS. 1 THROUGH 5

In use, the shafts 50 and 128 of the transmission 20 will be connected between a power source and a power user; for example, between an internal combustion engine and the wheels of a vehicle, so that the power source can be utilized to drive the using device. In making this connection, any suitable coupling mechanisms can be mounted on the shafts 50 and 128 and either of these shafts may be selected as the input shaft to the transmission 20 with the other shaft being selected as the output shaft. Additionally, the direction of rotation of the shafts can be selected in accordance with the application to which the transmission is to be put. With these selections, the threaded portion 64 of the first shaft 50 is selected to meet the criterion that has been noted above; that is, rotation of the pulley half 54 on the shaft 50 in the direction the shaft rotates will move the pulley half 54 toward the pulley half 56 if the shaft 50 is an output shaft and away from the pulley half 56 if the shaft 50 is an input shaft. For purposes of discussion, it will be considered that the shaft 50 is an output shaft and rotates in the direction 74 shown in FIG. 3. In this case, the criterion for the handedness of the threaded portion 64 provides that such portion will have right hand threads as illustrated in FIG. 3. Initially, again for purposes of illustration, it will be considered that the transmission 20 is set for operation at the lowest of a range of output speeds for a fixed input speed. In this case, the radius 62 in FIG. 3 will extend to the outer periphery of the pulley 52 and the radius 144 will be limited to a value that places the belt 28 adjacent the shaft 28.

Prior to operation of the transmission 20, the belt 28 will have been engaged by the conical faces 58, 60 and 140, 142 of the pulleys 52 and 134 respectively because of the force exerted on the first pulley half 54 of the pulley 52 by the spring 112. In particular, the spring 112 will urge the pressure plate 118 against the pulley half 54 to cause a rotational and axial movement of the pulley half 54 along the shaft 50 until the pulley half 54 engages the belt 28 and removes any slack therefrom.

When the transmission is then brought into operation by exerting a torque on the shaft 128 to turn such shaft and the second pulley 134 in the direction 202 in FIG. 3, frictional engagement between the belt 28 and the pulley 134 will give rise to movement of the belt 28 in the direction 76 shown in FIGS. 1 and 2. Thus, frictional engagement between the belt 28 and the first pulley 52 will initially begin to rotate the first pulley 52 in the direction 74 on the first shaft 50. Such rotation will move the pulley half 54 axially on the shaft 50 to result in a firm frictional engagement between the belt 28 and the first pulley 52. Further, because of the entrapment of the belt 28 between the conical surfaces 58 and 60, axial movement of the pulley half 54 will tend to expand the belt 28. Thus, the tendency of rotational movement of the first pulley 52 on the shaft 50 will tend to draw the belt 28 into a tighter radius within the second pulley 134 so that the conical surfaces on the halves of the pulley 134 will result in a similar firm frictional engagement between the belt 28 and the second pulley 134. Additionally, the disposition of the belt 28 between the halves 54 and 56 of the first pulley 52 will limit axial movement of the first pulley half 54 on the shaft 50 and, because of the mounting of the pulley half 54 on the shaft 50, consequently limit the rotation of the pulley half 54 and, via the pins 70 and 72, the pulley half 56 on the shaft 50. Thus, the torque exerted on the pulley 52 by the belt 28 will be transmitted through the threads in the bore of the first pulley 52 first pulley half 54 to the shaft 50 to drive the load connected thereto.

An important aspect of the invention is the operation of the transmission in circumstances in which the load on the shaft 50 undergoes an increase that would, in conventional transmissions, result in slippage between the belt 28 and the pulleys 52 and 134. Since the torque that drives the load is delivered through the threaded bore of the pulley half 54 and the threaded portion 64 of the first shaft 50, an increase in the load driven by the first shaft 50, tending to slow rotation of such shaft, while the pulley 52 is being driven at a constant rate by the belt 28, pulley 134, and shaft 128, will tend to rotate the first pulley 52 very slightly on the shaft 50 to drive the halves of the first pulley 52 into a firmer engagement with the belt 28. Further, because of the expansive tendency of such engagement on the belt 28, the belt 28 will be driven slightly deeper into the second pulley 134 to provide a firmer engagement between the belt 28 and second pulley 134. Thus, the coupling of rotation of the first pulley 52 to rotation of the shaft 50 via threads in the bore of the pulley half 54 and the threaded portion 64 of the shaft 50 adjusts the frictional forces between the belt 28 and pulleys 52, 134 proportionately to the load to eliminate belt slippage that has been a problem with conventional transmissions of the generic type.

The variable speed characteristics of the transmission 20 are provided by the ratio adjustment assembly 30. Should it be desired to increase the speed of the first shaft 50, the control shaft 188 and, consequently, the control gear 198 are rotated to, in turn, rotate the adjustment gear 174 on the threaded projection 172 via the meshed teeth of the gears 198 and 172. In particular, to increase the speed of the shaft 50, the control shaft is turned in a direction coordinate with the handedness of the threads on the projection 172 to advance the adjustment gear toward the second pulley 134. Such advancement drives the pusher plate 178 against the second pulley half 138 of the second pulley 134 so that the spacing of the halves of the pulley 134 is decreased with a resultant increase in the tension in the belt 28. This increase in tension in the belt 29 will drive the belt deeper into the first pulley to cause the first half 54 thereof to rotate slightly on the shaft 50 so that the first pulley half 54 of the pulley 52 will be backed away from the second pulley half 56 while the firm engagement between the belt 28 and pulley 52 is maintained. In this regard, it is noted that the pitch of the threaded portion 64 of the first shaft 50 and the mating threaded bore of the pulley half 54 is selected so that variable speed aspect of the invention or the load proportionate belt gripping aspect of the invention can be balanced or selectively emphasized in accordance with the application in which the transmission 20 is used.

To slow the shaft 50, the control shaft 188 is turned in the opposite direction to relieve the force exerted by the pressure plate 178 on the pulley half 138 of the second pulley and, consequently, to relieve tension in the belt. The resultant tendency of the belt to slacken is taken up by an expansion of the spring 112 to bring the load proportionate aspect of the mounting of the first pulley 52 on the shaft 50 into operation and force the belt 28 radially outwardly along the conical surfaces 58 and 60 of the pulley halves 54 and 56 respectively.

DESCRIPTION OF FIG. 6

Figure 6:
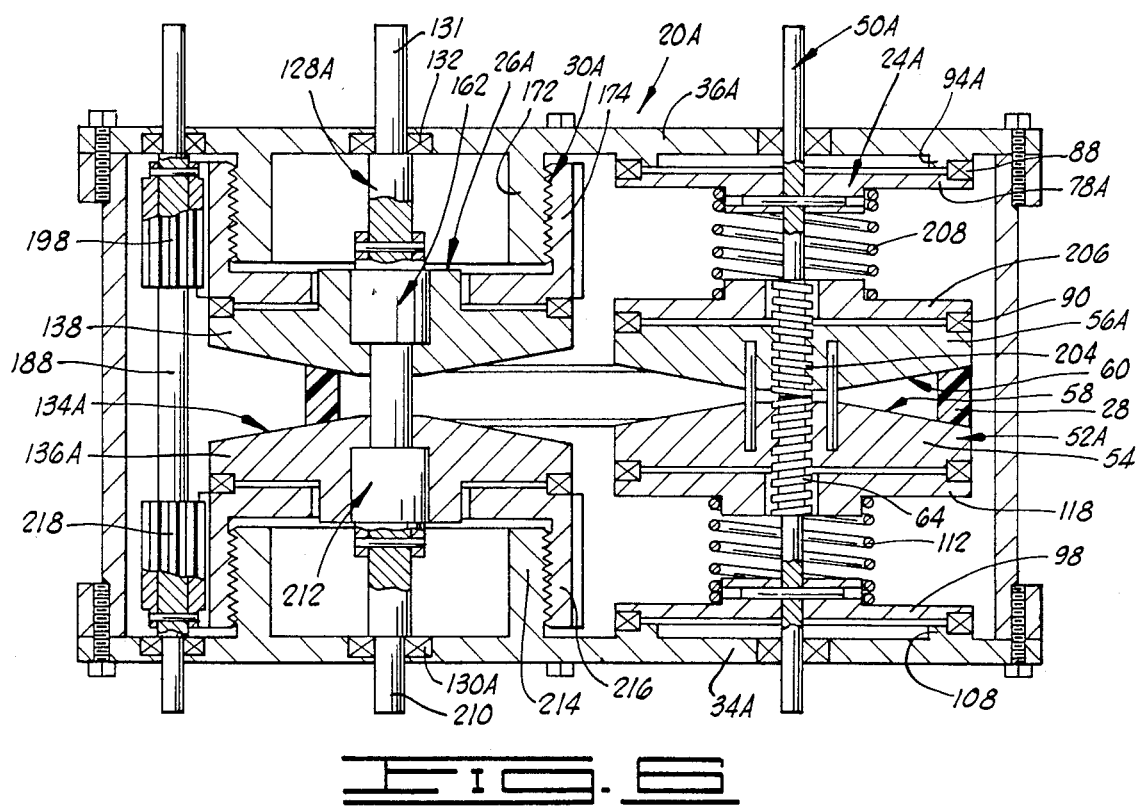
FIG. 6 is a cross section similar to FIG. 3 of a second embodiment of a continuously variable transmission constructed in accordance with the present invention.

FIG. 6 illustrates a second embodiment, designated by the numeral 20A, of a continuously variable transmission constructed in accordance with the present invention and including numerous components which are identical to components of the transmission 20. For clarity of description, components of the transmission 20A that are identical to corresponding components of the transmission 20 have been identified with the same numerical designations used for such component in FIGS. 1 through 5 and, further, components that are present in both transmissions but have a different form in the transmission 20A are identified by the same numerical designations excepting only that the letter "A" has been appended to the numerical designation of FIG. 6.

As in the case of the transmission 20, the transmission 20A is generally comprised of: a housing 22A; first and second shaft and pulley assemblies 24A and 26A respectively; a belt 28; and a ratio adjustment assembly 30A. Similarly, each of the shaft and pulley assemblies 24A and 26A is comprised of a shaft, 50A for the assembly 24A and 128A for the assembly 26A, and split pulleys, 52A for the assembly 24A and 134A for the assembly 26A, that are similar to their counterparts in the transmission 20. Accordingly, for clarity of disclosure, only the differences between these components of the transmission and similar components in the transmission 20 will be described.

In the transmission 20A, the first shaft 50A is provided with two threaded portions, the portion 64 of the shaft 50 and a second portion 204 that is adjacent the portion 64 to extend away from the conical surface 58 and the handedness of the portion 204 is opposite that of the portion 64. Concomitantly, the bore of the second pulley half 56A of the first pulley 52A is threaded to mate with the portion 204 and is mounted thereon so that rotational movement of the pulley 52 on the first shaft 50 will move the pulley halves 52, 54A in opposite axial directions thereon.

In the transmission 20A, the spacing ring 94A on the rear cover 36A is constructed to be a mirror image of the spacing ring 108 on the front cover 34A and the backing plate 78A is constructed in a manner that is identical to the backing plate 98 of both the transmissions 20 and 20A. In addition to the backing plate 78A, the transmission 20A includes a second pressure plate 206 that is identical to the pressure plate 118 of which both transmissions 20, 20A are comprised and the bearings 88 and 90 of the transmission 20A are disposed in shoulders of the backing plate 78A and spacing ring 94A and of the pressure plate 206 and the second pulley half 56A respectively. The backing plate 78A and pressure plate 206 are then urged apart by a spring 208 mounted on the backing plate 78A and pressure plate 206 in the same manner as the backing plate 98 and pressure plate 118 are urged apart by the spring 112 of which both transmissions 20 and 20A are comprised. Thus, it will be seen that the first shaft and pulley assembly 24A in the transmission 20A differs is such assembly in the transmission 20 in that the assembly 24A is provided with a bilateral symmetry in which both portions of the assembly to either side of a transverse plane passing through the center of the first shaft 50A are constructed as mirror images duplicating the structure of portions of the first shaft and pulley assembly 24 of the transmission 20 between the center of the shaft 50 thereof and the front cover 34 thereof.

The second shaft and pulley assembly 26A is similarly constructed in the form of two mirror image portions duplicating portions of the second shaft and pulley assembly 26 of the transmission 20 between the center of the second shaft 128 and the rear cover 36 of the transmission 20. Thus, the second shaft 128A is constructed in two bilaterally symmetric portions having reduced end portions 131 and 210 for axial support by radial thrust bearings 132 and 130A. Mounted thereon are the key member 162 that is a disposed in a double keyhole shaped portion of the second pulley half 138 of the second pulley 134A and an identical key member 212 similarly disposed in a similarly shaped portion of the bore of the first pulley half 136A, the latter being constructed identically to the pulley half 138 in the transmission 20A. Thus, in the transmission 20A, both halves of the second pulley 134A are turned by the shaft 128A but are free to move axially thereon.

Concomitantly with the construction of both halves of the second pulley 134A for sliding movement on the shaft 128A, the transmission 20A is provided with a ratio adjustment assembly 30A that duplicates portions of the assembly 30 found about portions of the shaft 128 between the pulley 134 and rear cover 36 in the transmission 20 and further duplicates such portions with their mirror images between the pulley 134 and the front cover 34A. Thus, the ratio adjustment assembly 30A is comprised of: the threaded projection 172 on the rear cover 36 and its mirror image projection 214 on the front cover 34A; the adjustment gear 174 screwed onto the projections 172 and its mirror image projection 216 on the projection 214; the control shaft 188; the control gear 198 mounted on the control shaft 188 and meshing with the adjustment gear 174; and a mirror image control gear 218 mounted on the control shaft 188 and meshing with the adjustment gear 216.

The operation of the transmission 20A differs from that of the transmission 20 only in that rotation of the control shaft 188 will axially position both halves of the second pulley 134A via movement of the adjustment gears 174 and 216 on the projections 172 and 214 and in that the load proportionate gripping characteristics of the first pulley 52A on the belt 28 are achieved by rotating movement of both halves of the first pulley 52A on threaded portions of the first shaft 50A.

DESCRIPTION OF FIGS. 7 THROUGH 10

FIGS. 7 through 10 illustrate a third embodiment, designated 20B, of a continuously variable transmission constructed in accordance with the present invention. Like the transmission 20A, the transmission 20B comprises elements that are identical to or modifications of elements of the transmission 20 so that such elements can be conveniently identified using the same numbers used for corresponding elements in the transmission 20 with an appended letter "B" for those elements which are modifications of the elements of the transmission 20.

Like the transmissions 20 and 20A, the transmission 20B is generally comprised of a housing 22B, first and second shaft and belt assemblies, 24B and 26B respectively, a belt 28 that engages pulleys 52B and 134B of which the assemblies 24B and 26B are comprised along circular arcs, and a ratio adjustment assembly (not numerically designated for the transmission 20C) that varies the ratio of the radii of such arcs. The transmission 20B differs from the transmissions 20, 20A primarily in the construction and operation of the ratio adjustment assembly, to be described below, with which the transmission 20B is provided and consequential differences in the shaft and pulley assemblies 24B and 26B.

In the transmission 20B, the first shaft and pulley assembly 24B is substantially identical to the first shaft and pulley assembly 24A of the transmission 20A so that, for clarity of description, the assembly 24B will not be described in detail; rather it will suffice to note that the assembly 24B has the same components as the assembly 24A and to describe differences in the construction of components from the assembly 24A to the assembly 24B.

In the transmission 20B, axial support for the first shaft 50B, of which the assembly 24B is comprised, is effected by radial thrust bearings 220 and 222 that are supported on the housing 22B in a manner that will be described below, the bearings 220 and 222 being mounted on end portions 224, 226 of the shaft 50B that are formed on a reduced diameter to provide shoulders on the shaft 50B for such purpose. The second shaft 134B, of which the second shaft and pulley assembly 26B is comprised, similarly has reduced diameter end portions 228 and 230 so that axial support is provided by radial thrust bearing 232 and 234 mounted directly on the covers 34B and 36B of the housing 22B. Concomitantly with such support of the shafts 50B and 134B, the spacing rings, such as the spacing ring 94 on the rear cover 34 of the housing 22 in transmission 20, are deleted from the covers 34B and 36B of the housing 22B. The covers are further modified by providing them with elongated slots 236 and 238, for covers 34B and 36B respectively, that are disposed on and extend along a line between the centers of the shafts 50B and 134B. The purpose of the slots 236 and 238 will become clear below.

In keeping with the elimination of the spacing rings in the transmission 20B, the backing plates 78B and 98B of the assembly 24B can be formed on a smaller diameter than in the assembly 24A of the transmission 20A. In particular, the plates 78B and 98B need only be large enough to support the spring 112 and 208, also found in the assembly 24A of the transmission 20A, that urge the pulley halves 54B and 56B together. These pulley halves are identical to the pulley halves 54A and 56A of the transmission 20A.

In the second shaft and pulley assembly 26B of the transmission 20B, the pulley 134B is of unitary construction and is secured to the second shaft 134B by a pin 240 so that the pulley 134B is in a fixed position that aligns with the center of the pulley 52B and is engaged by the belt 28 along an arc that has a fixed radius about the center of the shaft 134B. Consequently, the ratio of the radii of the arcs along which the belt engages the pulleys 52B and 134B is varied by varying the radius of the arc at the first pulley 50B as will be discussed below.

In the transmission 20B, the ratio adjustment assembly is comprised of: identical bearing blocks 242 and 244 that are slidably mounted on the front and rear covers, 34B and 36B respectively, of the housing 22B; hydraulic actuating cylinders 246 and 248 similarly mounted on the covers 34B and 36B respectively; and a hydraulic circuit 250 that has been illustrated in FIG. 10.

As shown in FIGS. 7 through 9 for the bearing block 242, each bearing block is comprised of an outer portion 243 having an extension 245 on one side thereof to extend through one of the slots, 236 for the bearing block 242, formed through the covers 34B, 36B on which the blocks 242, 244 are mounted. The extensions 245 are sized to engage the upper and lower edges of the slots and are shorter in length than the slots so that the bearing blocks can be moved back and forth along the slots in a manner to be discussed below. A circular well 247 is formed in the distal end of each extension 245 to receive one of the bearings 220, 222 that support the first shaft 50B. Thus, the shaft 50B can be moved toward and away from the shaft 134B by movement of the bearing blocks 242, 244 in the slots 236 and 238. The bearing blocks are secured to the housing 22B via platelike inner portions 249 thereof that are bolted to the distal ends of the extensions 245.

Referring specifically to FIG. 7, the piston rods 251 and 253 of the hydraulic actuating cylinders 246 and 248 respectively enter bores 255, 257 in the ends of the outer portions of the bearing blocks 242, 246 and are pinned therein so that the bearings blocks can be longitudinally positioned on the housing 22B by the hydraulic circuit 250 shown in FIG. 10 to which attention is now invited. As shown therein, the circuit 250 includes a pump 252 which draws hydraulic fluid from a sump 254 and discharges the fluid under pressure to one input port (not shown) of a conventional blocked center, two-way valve 256, the other input port of the valve forming a return to the sump via conduit 259. The hydraulic actuating cylinders 246 and 248 are serially connected to the output ports of the valve 256 so that the piston rods 251 and 253 of the hydraulic actuating cylinders 246, 248 can be simultaneously extended by operating the valve 256 to interpose a first end section 258 thereof between the input and output ports thereof, simultaneously retracted by interposing a second end section 260 between the input and output ports, or locked in place by interposing the blocked enter section 262 between the input and output ports.

The operation of the transmission 20B differs form that of the transmissions 20 and 20A in the manner in which the ratio of the radii of the arcs along which the belt 28 engages the pulleys 50B and 134B is varied. In the transmission 20B, the radius of the arc at the pulley 134B is fixed and the radius of the arc at the pulley 52B is varied by using the circuit 20 to vary the separation of the shafts 50B and 128B and thereby increase the tension in the belt 28 or provide a tendency for a relaxation of the belt 28. In particular, operation of the valve 256 to extend the piston rods 251, 253 of the hydraulic actuating cylinders 246, 248 and thereby increase the separation of the shafts 50B and 128B will increase the tension in the belt 28 to cause the belt 28 to move radially inwardly on the pulley 52B in the same manner that an increase in belt tension will have this effect in the transmission 20. Thus, since the radius of the arc along which the second pulley 134B is engaged by the belt 28 is fixed, the ratio of the radius at the first pulley 50B to the radius at the second pulley 134B is decreased by extending the piston rods 251, 253. If the piston rods are retracted, the first shaft 50B will move toward the second shaft 128B resulting in a tendency to relax the belt 28 that results in a radially outward movement of the belt 28 on the first pulley 52B, in the manner that a tendency toward relaxation of the belt 28 has this effect in the transmission 20. Thus, the movement of the shaft 50B toward the shaft 134B will increase the ratio of the radius of the arc at the pulley 52B to the radius of the arc at the pulley 134B.

DESCRIPTION OF FIGS. 11 THROUGH 14

FIGS. 11 through 14 illustrate yet another embodiment, designated 20C, of a continuously variable transmission constructed in accordance with the present invention. Like the transmissions 20A and 20B, the transmission 20 is comprised of elements that are identical to or modifications of elements of the transmission 20 so that such elements can conveniently be identified using the same numbers used for corresponding elements of the transmission 20 with an appended letter "C" for those elements that have been modified.

As in the case of the previously described embodiments of the transmission of the present invention, the transmission 20C is generally comprised of: a housing 22C which differ from the housing 22 only in that the spacing rings 94 and 108 on the covers 34 and 36 of the housing 22 are eliminated in the housing 22C and laterally extending slots 270 and 272 are formed through the covers 34C and 36C respectively of the housing 22C in the manner of, and for the same purpose, that slots are formed through the housing covers of the transmission 20B; a first shaft and pulley assembly 24C that differs from the shaft and pulley assembly 24 only in that the shaft 50C thereof has end portions 274, 276 formed on a reduced diameter relative to adjacent portions of such shaft to permit both axial and radial support of the shaft 50C by radial thrust bearing 278, 280 on the portions 274 and 276, the elimination of the bearing 88 used to axially support the backing plate 78 in the transmission 20 and the concomitant elimination of the shoulder for such bearing in the backing plate 78C of the transmission 20C, and the elimination of radially extensive portions of the backing plate 98 from the backing plate 98C in the assembly 24C; a second shaft and pulley assembly 26 of the transmission 20; a belt 28C that differs from the belt 28 in a manner that will be discussed below; and a ratio adjustment assembly 30 that is identical to the ratio adjustment assembly 30 of the transmission 20.

Figure 12:
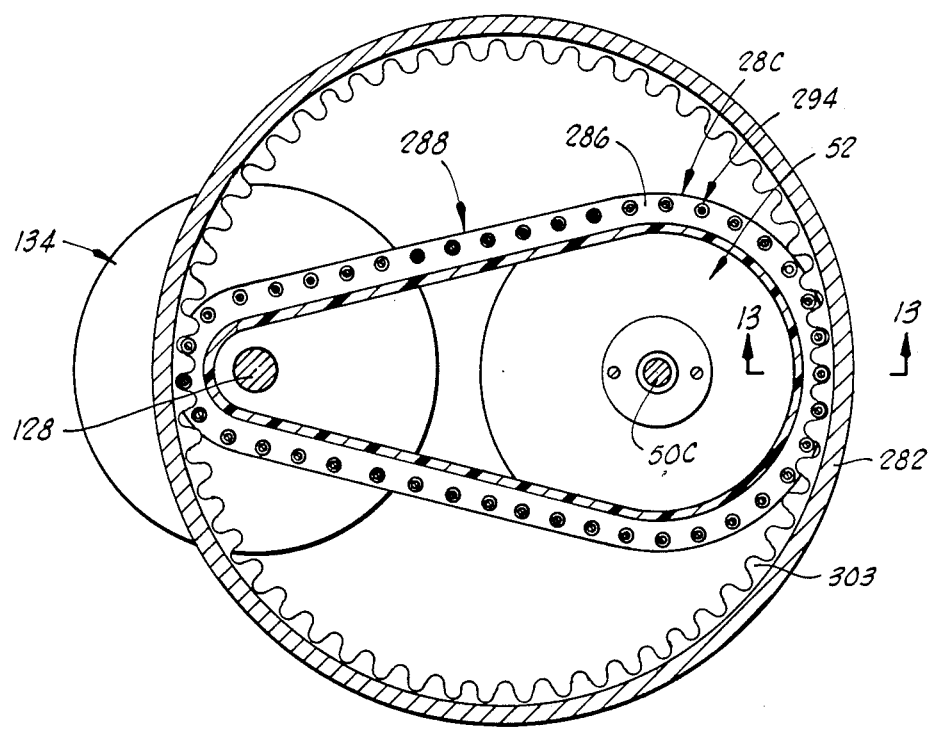
FIG. 12 is a cross section of a portion of the transmission of FIG. 11 taken along line 12—12 of FIG. 11.
Figure 16:
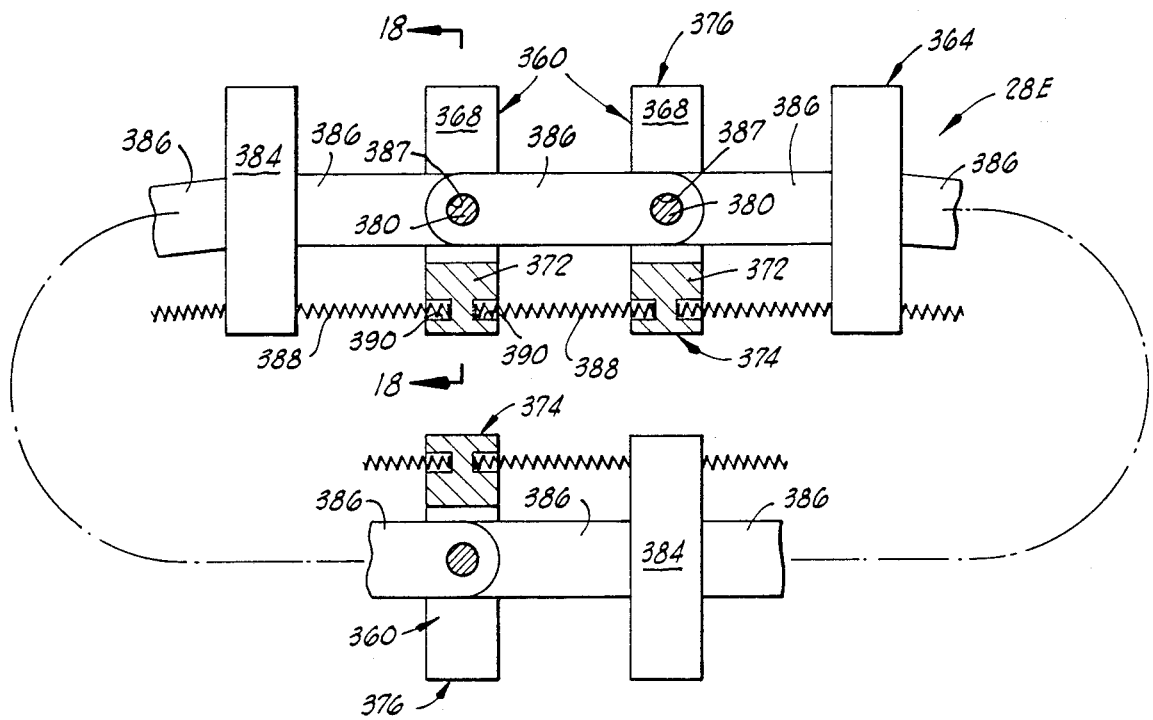
FIG. 16 is a fragmentary, side elevational view of an alternative construction for the belt used in the transmission of FIG. 11.

In addition to these elements, the transmission 20C is comprised of: a ring gear 282 that extends about the belt 28 as shown in FIG. 12 to engage the belt 28C, as will be described below, at the midpoints of both arcs along which the belt 28C extends on the pulleys 52 and 134; and a shaft biasing assembly 284 that supports the first shaft and pulley assembly 24C and urges the shaft 50C thereof away from the shaft 128 of the second shaft and pulley assembly 26 to maintain the engagement between the ring gear 282 and belt 28C.

Referring to FIG. 13 and with continuing reference to FIG. 12, the belt 28C is comprised of an endless elastomeric band 286, which can be cloth reinforced in a conventional manner, that has a V-shaped cross-section opening to the outer periphery 288 of the belt 28C. A pair of endless reinforcing bands 290, 292 constructed of braided metal cable are imbedded in the elastomeric band 286, one of the bands 290 and 292 in each side of the V configuration of the band 286, and the belt 28C is further comprised of a plurality of transverse members 294 that are each secured to the reinforcing bands 290 and 292 to extend across the channel between the sides of the V of the band 286 as shown in FIG. 13. To this end, each of the transverse members 294 is comprised of a cylindrical pin 296 having diametrically extending bores 298, 300 formed through end portions thereof to receive the reinforcing bands 290, 292 and the bores are secured about the bands 290, 292 in any convenient manner such as; for example, via a suitable adhesive. Each of the transverse members 294 is further comprised of a tube 302 that is mounted on central portions of the pin 296 so that each transverse member 294 has the form of a roller within the channel between the sides of the band 286. As shown in FIG. 12, the transverse members 294 are equally spaced within the channel between the sides of the band 286 to form a row that extends along the circumference of the belt 28C. As further shown in such Figure, the ring gear 282 is provided with a plurality of equally spaced, inwardly extending teeth 303 that are shaped to extend into the channel between the sides of the elastomeric band 286 and engage the transverse member 294 adjacent each of the shafts 50C and 134 and at opposite ends of a diameter of the ring gear 282. Positioning of the ring gear for such engagement is effected by urging the shafts 50C and 128 apart to force the transverse members 294 into the teeth 303 at each end of a diameter of the ring gear.

Figure 11:
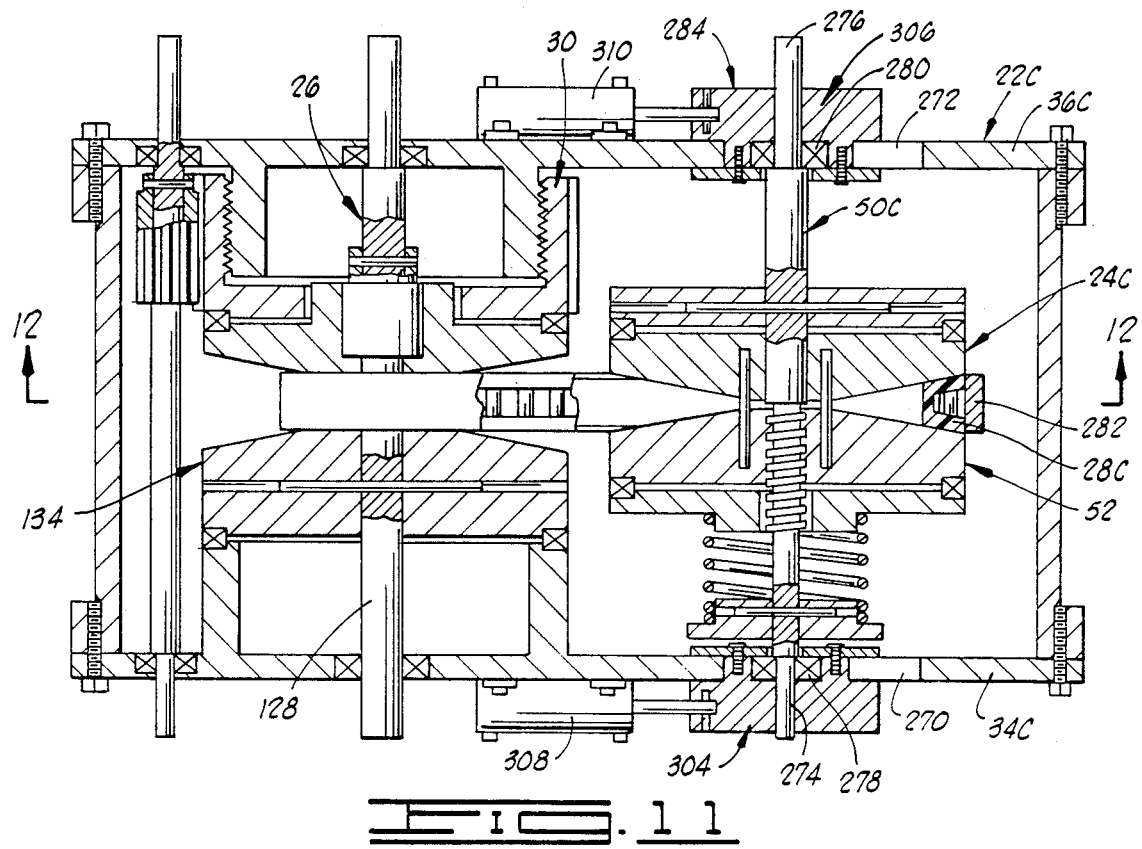
FIG. 11 a cross section similar to FIG. 3 of another preferred embodiment of the continuously variable transmission of the present invention.

One preferred form of the shaft biasing assembly 284 that maintains engagement between the belt 28C and the ring gear 282; that is, maintains the meshing of the teeth 303 of the ring gear and the transverse members 294 of the belt, has been illustrated in FIGS. 11 and 14. The biasing assembly 284 is generally comprised of bearing blocks 304, 306 (FIG. 11) and hydraulic actuating cylinders 308, 310 (FIGS. 11 and 14), that are part of a hydraulic circuit 312 shown in FIG. 14. The bearing blocks 304 and 306 can conveniently be constructed identically to the bearing blocks 242 and 244 of the transmission 20B and mounted on the housing 22C in a manner that is identical to the mounting of the bearing blocks 242 and 244 to support the first shaft 50C in a manner that is identical to the support of the first shaft 50B in the transmission 20B. Similarly, the hydraulic actuating cylinders 308 and 310 are identical to the hydraulic actuating cylinders 246 and 248 of the transmission 20 and are coupled to the bearing blocks 304 and 306 in a manner that is identical to the coupling of the hydraulic actuating cylinders to the bearing blocks in the transmission 20B so that further discussion of the bearing blocks and the hydraulic actuating cylinders will not be necessary for purposes of this disclosure. Rather, a description of the hydraulic circuit 312 will suffice to provide a complete description of the structure and operation of the shaft biasing assembly 284.

As shown in FIG. 14, the hydraulic actuating cylinders 308 and 310 are connected in parallel in the hydraulic circuit 312 via conduits 314 and 316 connecting ports (not shown) adjacent the rear and front ends, 318 and 320 respectively, of each of the cylinders 308 and 310. Thus any excess in the pressure in the conduit 314 over the pressure in the conduit 316 will tend to extend the piston rods 322 and 324 of the hydraulic actuating cylinders 308 and 310 respectively and, as will be clear form the coupling of the cylinders 308, 310 to the bearing blocks 304, 306 in FIG. 11, exert balanced forces on the ends of the shaft 50C to urge the shafts 50C and 128 of the transmission 20C apart. Consequently, such a pressure differential between the conduits 314 and 316 will extend the loop formed by the belt 28C along the diameter of the ring gear 282 and insure seating to the transverse members 294 in the teeth 303 of the ring gear 282 at both ends of the loop formed by the belt 28C. This pressure differential is provided by: a pump 326 that draws hydraulic fluid from a sump 328 and delivers the fluid under pressure to the conduit 314 on conduit 330; a conduit 332 that returns fluid from the conduit 316 to the pump 328; and a pressure relief valve 334 that is connected between the conduits 330 and 332 to shunt fluid from the conduit 330 to the conduit 332 at a pressure differential between the conduits 314 and 316 that is selected by the choice of the valve 334. Thus, the circuit 312 provides a constant biasing force that maintains meshing engagement between the belt 28C and the ring gear 282 in normal operation of the transmission 20C.

It is contemplated that the transmission 20C may at times be used in situations in which the load upon the transmission 20C may be subject to large transients and, further, that the "gear ratio" of transmission may be computer controlled (by computer control of the ratio adjustment assembly 30). In such situations, a rapid readjustment of the transmission 20C to follow a transient might conceivably cause a disengagement of the teeth 303 of the ring gear 282 and the transverse members 294 of the belt 28C. Such disengagement is prevented by the placement of an orifice 336 in series with the pressure relief valve 334 to retard shunting of fluid between the conduits 330 and 332 and, in effect, provide a transient pressure differential between the conduits 314 and 316 that will enable the biasing assembly 284 to follow any readjustment of the transmission 20C.

The operation of the transmission 20C is similar to the operation of the transmission 20 in both the manner in which the "gear ratio" of the two transmissions; i.e., the ratio of the radii of the arcs along which the pulleys 52 and 134 engage the belt 28C, is set and the manner in which load proportionate gripping of the belt 28C is achieved. The operations differ only in the transmission of torques between the two shaft 50 and 134. Where torque is transmitted by the belt 28 in the transmission 20, torque is transmitted by the ring gear 282 in the transmission 20C with the belt 28C providing, in essence, two variable diameter gears that are engaged by the ring gear 282 and achieve rigidity via the load proportionate gripping feature of the transmission. The transfer of torque by the ring gear rather that the belt thus eliminates flexing of the belt that has caused problems with conventional transmissions of the generic type to extend the lifetime of the belt as well as enable larger torques to be transmitted between the shafts 50 and 134.

DESCRIPTION OF FIG. 15

FIG. 15 illustrates a modified construction for the shaft biasing assembly, 284D in FIG. 15, of the transmission 20C shown in FIGS. 11 through 14. In the shaft biasing assembly 284D, the hydraulic circuit 312, including the hydraulic actuating cylinders 308 and 310 shown in FIG. 11, are deleted and biasing of the bearing blocks 304D and 306 (the bearing blocks 304D and 306D differ from the bearing blocks 304 and 30 only as will be discussed below), that support the first shaft 50C, away from the second shaft (not shown in FIG. 15) is accomplished by tension springs 338 and 340. To this end, threaded holes 342 and 344 are formed in the front and rear covers, designated 34D and 36D respectively in FIG. 15, of the transmission housing near the end 42 thereof adjacent the first shaft and pulley assembly 24C and parallel threaded holes 346 and 348 are formed in the outer portions 350 and 352 of the bearing blocks 304D and 306D. (The bearing blocks 304D and 306D differ from the bearing block 304 and 306 only in the presence of the holes 350 and 352 in the bearing blocks 304D and 306D and the absence of holes to receive the piston rods of the hydraulic actuating cylinders 308 and 310 of the shaft biasing assembly 384.) Pins 351 and 353, having threaded portions screwed into the holes 342 and 344 respectively, and pins 354 and 356, having threaded portions screwed into the holes 346 and 348 respectively, then support the springs 338 and 340 via holes (not numerically designated in the drawings) formed transversely through the pins 350–356 to receive hook shaped end portions (not numerically designated in the drawings) of the springs 338 and 342. The biasing assembly 248D operates to maintain a separation of the shafts 50 and 134 (the shaft 134 has not been illustrated in FIG. 15) that will ensure meshing engagement between the ring gear 282 and belt 28C of a transmission having, except for the shaft biasing assembly, the construction of the transmission 20C shown in FIGS. 11 through 14.

DESCRIPTION OF FIGS. 16 THROUGH 19

FIGS. 16 through 19 illustrate an alternative construction for a belt, designated 28E, suitable for use in a continuously variable transmission including a ring gear in the manner of the transmission 20C that has been previously discussed. In general, the belt 28E is comprised of a plurality of metal support members 360 that are interconnected in the manner of a drive chain to form a loop as indicated by dashed lines in FIG. 16. In part, the interconnection of the support members 360 is effected via transverse members 362 (FIGS. 17 through 19) that are similar to the transverse members 294 of the belt 28C so that, when the belt 28E is used in a continuously variable transmission having the general construction of the transmission 20C discussed above, the transverse members of the belt 28E will be engaged by teeth of the ring gear 282 (the ring gear 282 is not shown in FIGS. 16 through 19) of such transmission and torque will be transmitted between shafts of the transmission by the ring gear rather than the belt 28E in the manner described above.

Figures 17, 18:
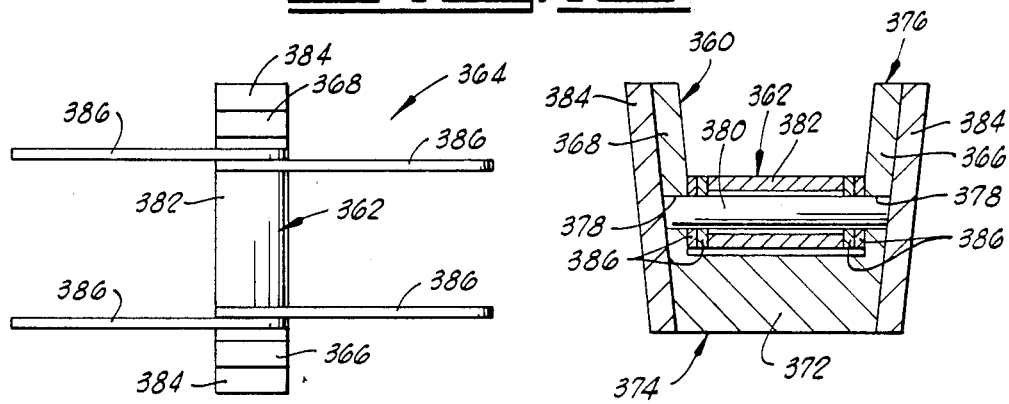
FIG. 17 is a plan view of a link of the belt of FIG. 16
FIG. 18 is a cross section taken along line 18—18 of FIG. 16.
Figure 19:
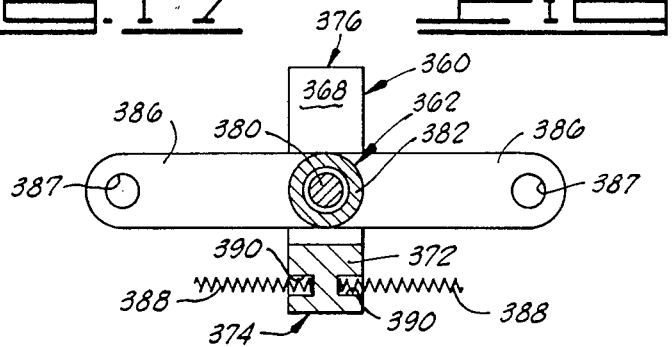
FIG. 19 is a vertical cross section of a link of the belt of FIG. 16.

The support members 360 and transverse members 36 thus form portions of repeated modules 364, the construction of which have been shown for one module 364 in FIGS. 17 through 18. As shown in these Figures, each support member 360 has spaced apart sides, 366 and 368, converging toward and connected by a base portion 372 at the lower end 374 of the support member so that the sides 366, 368 form a channel that opens to the upper end 376 of the support member 360. An aperture 378 is formed through each side 366, 368 of each base member 360, near the base portion 372, and each transverse member 362 is comprised of a pin 380 having end portions secured within the apertures 378 of both sides 366, 368 so that central portions of the pins 380 extend transversely across the channel between the sides of the support member 360. A tube 382 is mounted on central portion of each pin 380 to provide the transverse member 362 with the form of a roller in the manner that such construction is utilized in the belt 28C of the transmission 20C that has been previously described. Each module is then further comprised of a pair of friction enhancing liners 384 that are secured to the oppositely facing surfaces of the sides 366, 368 and are constructed of mineral fibers embedded in an organic matrix in the manner of automobile brake shoes.

The interconnection of the modules 364 and, hence, the support member 360 is accomplished by metal links 386 having apertures 387 (FIG. 16) at each end thereof to receive the pins 380 of transverse members 362 of adjacent modules 364. Two such links are mounted on each end of each pin 380 and extend in opposite directions, as particularly shown in FIG. 17, to the pins of the modules 364 to either side of the module on which the links are mounted and thereby form the belt 28E into a whole in the manner of a drive chain as has been noted above. In the connection of the modules 364 to form the belt 28E, each support member 360 is oriented such that the lower end thereof is directed toward the interior of the loop of the belt 28E with the result that the sides 366, 368 of each support member 360, and liners 384 thereon will converge toward the interior of the loop. In the practice of the invention, the sides 366, 368 of the support members 360 are angled relative to each other to match the cone angle of the pulley halves in a transmission in which the belt 28E is used so that the liners will mate with the conical surfaces on the pulley halves and be firmly gripped thereby i a radial alignment of the modules along the surfaces of the pulleys. Such alignment is provided by springs 388 having end portions captured in blind holes 390 formed in opposite sides of the base portion 372 of each support member and extending to the adjacent support member of the belt 28E to urge adjacent support members to a substantially parallel relation.

It will be clear that the present invention is well adapted to carry out the objects and attain the ends and advantages mentioned as well as those inherent therein. While presently preferred embodiments have been described for purposes of this disclosure, numerous changes may be made which will readily suggest themselves to those skilled in the art and which are encompassed in the spirit of the invention disclosed and as defined in the appended claims.

What is claimed is:

1. In a continuously variable transmission of the type having parallel first and second shafts rotatably mounted on a housing, first and second pulleys mounted on the first and second shafts respectively, wherein at least the first pulley is divided into axially spaced first and second pulley halves each having a conical surface formed thereon at the side of the pulley half facing the other pulley half and converging toward the axis of the first shaft, an endless belt extending about the pulley along a circular arc, and means for adjusting the ratio of the radii of the arcs along which the belt engages the pulleys, the improvement wherein the first shaft has a threaded portion and the first pulley has an axial threaded bore mating with the threads on the first shaft; and wherein:

the second pulley is divided into axially spaced first and second pulley halves each having a conical surface formed thereon at the side of the pulley half facing the other pulley half and converging toward the axis of the second shaft; wherein the first pulley half of the second pulley is fixed on the second shaft and the second pulley half of the second pulley is mounted on the second shaft for axial sliding movement toward and away from the first pulley half of the second pulley; and wherein the means for adjusting the ratio of the radii of the arcs along which the belt engages the pulleys comprises:

an externally threaded projection formed on the housing to extend about portions of the second shaft to the side of the second pulley half of the second pulley opposite the first pulley half of the second pulley;

a tubular adjustment gear having a circumferentially extending series of teeth formed on the outer periphery thereof, wherein the adjustment gear is coaxially mounted on the projection and the bore of the adjustment gear is threaded to mate with the threads on the projection;

a control shaft rotatably mounted on the housing; and a control gear mounted on the adjustment shaft and having a circumferentially extending series of teeth mating with the teeth of the adjustment gear.

2. In a continuously variable transmission of the type having parallel first and second shafts rotatably mounted on a housing, first and second shafts rotatably mounted on a housing, first and second pulleys mounted on the first and second shafts respectively, wherein at least the first pulley is divided into axially spaced first and second pulley halves each having a conical surface formed thereon at the pulley half facing the other pulley half and converging toward the axis of the first shaft, an endless belt extending about the pulleys to engage each pulley along a circular arc, and means for adjusting the ratio of the radii of the arcs along which the belt engages the pulleys, the improvement wherein the first shaft has a threaded portion and the first pulley half of the first pulley has an axial, threaded bore mating with the threads on the first shaft; and wherein:

the belt is characterized as having a plurality of parallel transverse members arranged in a row extending along the circumference thereof; and wherein the transmission further comprises:

two bearing blocks slidably mounted on the housing for movement toward and away from one of the shafts and rotatably supporting end portions of the other shaft;

biasing means for urging the bearings blocks away from said one of the shafts; and a ring gear having internal teeth, the ring gear extending about the belt to engage the teeth thereof with the transverse members of the belt.

3. The transmission of claim 2 wherein the biasing means comprises:

a hydraulic actuating cylinder connected between the housing and each of the bearing blocks; and means for providing hydraulic fluid to the hydraulic actuating cylinders at a substantially constant pressure.

4. The transmission of claim 3 wherein the hydraulic actuating cylinders are connected in a parallel circuit and the means for providing hydraulic fluid to the hydraulic actuating cylinders comprises:

a pump in fluid communication with the hydraulic actuating cylinders for providing pressurized hydraulic fluid thereto;

a pressure relief valve connected in parallel across the hydraulic actuating cylinders for bypassing hydraulic actuating fluid around the hydraulic actuating cylinders at a preselected pressure differential across the hydraulic acuating cylinders; and an orifice connected in series with the pressure relief valve.

5. The transmission of claim 2 wherein the belt further comprises:

an endless elastomeric band having a substantially V-shaped transverse cross section opening to the outer periphery of the belt; and an endless reinforcing band constructed of braided metal cable embedded in medial portions of both sides of the V of the elastomeric band; and wherein each transverse member is comprises:

a cylindrical pin attached to both reinforcing bands and extending between the sides of the elastomeric band; and a tube mounted on central portions of the pin.

6. The transmission of claim 2 wherein the belt further comprises:

a substantially V-shaped support member for each transverse member opening outwardly of the belt;

means for linking the support members together;

a liner formed of mineral fibers embedded in an organic matrix mounted on each side of each support member; and means for urging adjacent support members toward a substantially parallel relation; and wherein each transverse member comprises:

a cylindrical pin attached at its ends to both legs of a support member; and a tube mounted on central portion of the pin.

7. In a continuously variable transmission of the type having two spaced apart, parallel shafts rotatably mounted on a housing, an axially split pulley on each shaft, an endless belt extending in a loop about the pulleys to engage each puley along a circular arc, and means for adjusting the ratio of the radii of the arcs along which the belt engages the pulleys, the improvement wherein the radii ratio adjusting means comprises:

an externally threaded projection formed on the housing to extend about portions of one of the shafts;

a tubular adjustment gear having a circumferentially extending series of teeth formed on the outer periphery thereof, wherein the adjustment gear is coaxially mounted on the projection and the bore of the adjustment gear is threaded to mate with the threads on the projection, a control shaft rotatably mounted on the housing; and a control gear mounted on the adjustment shaft and having a circumferentially extending series of teeth mating with the teeth of adjustment gear.

8. In a continuously variable transmission of the type having two spaced apart, parallel shafts rotatably mounted on a housing, a pulley, at least on of which is axially split, on each shaft, an endless belt extending in a loop about the pulleys to engage each pulley along a circular arc, and means for adjusting the ratio of the radii of the arcs along which the belt engages the pulleys, the improvement wherein the radii ratio adjusting means comprises:

two bearing blocks slidably mounted on the housing for movement toward and away from one of the shafts and rotatably supporting end portions of the other shaft; and means for positioning the bearing blocks on the housing.

* * * * *